Aug. 26, 1941.  C. STONEHILL  2,253,961
ALTERNATING CURRENT MOTOR AND CONTROLLER
Filed Aug. 23, 1939
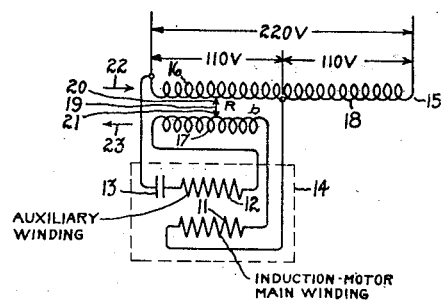
Inventor:
Cyrus Stonehill,
by Harry E. Dunham
His Attorney.

Patented Aug. 26, 1941

2,253,961

UNITED STATES PATENT OFFICE 2,253,961

ALTERNATING CURRENT MOTOR AND CONTROLLER

Cyrus Stonehill, Fort Wayne, Ind., assignor to General Electric Company, a corporation of New York Application August 23, 1939, Serial No. 291,529

4 Claims. (Cl. 172—278)

My invention relates to alternating-current motors and controllers and concerns particularly single-phase induction motor systems.

It is an object of my invention to provide an improved, simplified controller and connection for self-starting variable speed single-phase alternating-current motors in which there will be no necessity for short circuiting turns, or any likelihood thereof, and in which there is no need for pigtail connections or power-wasting carbon brushes. Other and further objects and advantages will become apparent as the description proceeds.

In carrying out my invention in its preferred form I utilize a condenser-type of induction motor and a transformer-type controller. The motor has a main or running winding and an auxiliary or condenser winding displaced in space phase from the running winding. The controller is provided with separate oppositely wound windings and a slider for making adjustable connections between adjacent points on the two transformer windings to control the motor speed. The motor windings are interposed in connections between the ends of the transformer windings.

The invention will be understood more readily from the following detailed description when considered in connection with the accompanying drawing and those features of the invention which are believed to be novel and patentable will be pointed out in the claims appended hereto. The single figure of the drawing is an electrical circuit diagram representing an embodiment of my invention.

The conventional type of single-phase induction motor may be employed having a main or running winding 11, an auxiliary or condenser winding 12 and a phase splitting or modifying device such as a reactance in the form of a condenser 13 in series with the auxiliary winding 12, all of which parts are shown within the dotted rectangle 14. For the purpose of providing a starting connection and for varying the speed of the motor I provide a controller 15 having a pair of windings 16 and 17, respectively. The controller or transformer 15 may include also suitable windings for adapting a motor wound for a given voltage to a different supply voltage. For example, the winding 16 may be connected in series with another winding 18 or may form a section of a transformer coil with an intermediate tap such that the windings 16 and 18 together form the primary 220-volt winding of a step-down auto transformer, and the winding 16 alone forms the 110 volt winding of such a transformer, assuming the controller to be used for an induction motor having a normal rating of 110 volts. The winding 16 is thus conductively connected to the 220 volt supply circuit so as to be conductively energized thereby; whereas the winding 17 is inductively coupled. For maximum simplicity of construction and ease of operation the windings 16 and 17 are preferably oppositely wound and arranged one along the other, for example, on the same core, and for varying the connections a slider 19 is provided carrying sliding contacts 20 and 21 cooperating with stationary contacts or scraped turns of the transformer windings 16 and 17, respectively. The terminals at the ends of each of the windings 16 and 17 have one of the motor windings connected across them. For example, the motor winding 11 may be connected between the right hand ends of the windings 16 and 17, and the motor winding 12 with the condenser 13 in series, may be connected across the left hand ends of the transformer windings 16 and 17. The arrangement is such that as the slider 19 is moved in one direction or the other more of the windings 16 and 17 is cut into one of the motor-winding circuits, and less is cut into the other of the motor-winding circuits, each motor-winding circuit having portions of each of the controller windings 16 and 17 connected in series with it.

With the slider 19 shown approximately in the central position R and with the assumed voltages it will be seen that approximately 110 volts is applied in each of the motor winding circuits. The slider 19 is preferably in the central position when the motor is started in order to have approximately full rated voltage applied to the motor. The speed variation of the motor 14 is obtained by moving the slider 19 in one direction or the other, it being understood that the greater the voltage applied to the main winding 11 the greater the speed. The lower the desired operating speed the greater the need for quadrature field for adequate torque, and accordingly the greater the voltage automatically applied to the auxiliary or quadrature winding 12. For example, to operate the motor at low speed, slider 19 may be moved to the right to the position marked b in which relatively small numbers of turns of the windings 16 and 17 will be connected in series with the main winding 11 and a relatively large number of turns will be connected in series with the auxiliary winding 12. For instance, at the position b of the slider 19 approximately 25 volts might be applied to the main winding 11 and consequently approximately 195 volts to the higher impedance circuit of the auxiliary winding 12 and the condenser 13. Since the windings 16 and 17 are oppositely wound, as indicated by the arrows 22 and 23 and are also connected in opposite relation to the motor windings, it will be apparent that the voltages applied in each of the motor windings act cumulatively or aid each other.

It will be observed that before the electrical connections between the motor windings and the controller or transformer windings are made in either the motor or the transformer, each of the transformer windings 16 and 17 is wholly independent of the other, except for the inductive relation. Consequently, there are no short circuited turns for any position of the controller. Furthermore, there is no need for the sliding contactors 20 and 21 to bridge contacts in going from one position to the next, and consequently there is no need for short circuiting of turns in going from one speed setting to the other or for using carbon brushes to minimize short circuit currents. Since the variable connections from one transformer to the other are made directly by the slider 19 there is no need for pigtail or other power wasting devices, and the construction, therefore, provides the utmost in simplicity and durability.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. An induction motor having a main winding and an auxiliary winding displaced in space phase, a phase modifying device connected in series with the auxiliary winding, a transformer having a winding adapted to be conductively connected to a supply circuit and an oppositely wound second winding in inductive relation to the first, lying along the said first winding so that successive points on the second winding lie along successive points on the first, and a slider for electrically connecting points of the second transformer winding to adjacent points of the first transformer winding, said main motor winding being connected between one end of the first of said transformer windings and the corresponding end of the second of said transformer windings and said auxiliary motor winding and phase modifying device being connected between the remaining ends of said transformer windings.

2. An alternating-current motor having a main stator winding and an auxiliary stator winding displaced in space phase, a condenser connected in series with the auxiliary winding, a transformer having a winding adapted to be conductively connected to a supply circuit and a second winding in inductive relation to the first, adjustable connections to intermediate portions of said transformer windings, and a conductor joining said adjustable connections, conductors connecting the main motor winding in series with a portion of the first of said transformer windings between the end and intermediate adjustable connection and a portion of the second transformer winding between the adjustable connection and the end of the winding such as to apply series voltages aiding each other in the main motor winding circuit, conductors connecting the auxiliary motor winding and the condenser in series with the portions of said transformer windings between the adjustable connections and the remaining ends of said windings, whereby series voltages aiding each other are applied also in the auxiliary motor winding circuit, and means for simultaneously moving said adjustable connections in such a direction as to increase the series voltages applied to one of said motor windings and to decrease the series voltages applied to the other of said motor windings.

3. An alternating-current motor having a main stator winding and an auxiliary stator winding displaced in space phase, a condenser connected in series with the auxiliary winding, a transformer having a winding adapted to be conductively connected to a supply circuit and a second winding in inductive relation to the first, adjustable connections to intermediate portions of said transformer windings, a conductor joining said adjustable connections, conductors connecting the main motor winding in series with a portion of the first of said transformer windings between the end and intermediate connection and a portion of the second transformer winding between the adjustable connection and the end of the winding such as to apply series voltages aiding each other in the motor winding circuit, conductors connecting the auxiliary motor winding and the condenser in series with the portions of said transformer windings between the adjustable connections and the remaining ends of said windings, whereby series voltages aiding each other are applied also in the auxiliary motor winding circuit, and means for moving said connections along said transformer windings.

4. An alternating-current supply circuit having a given voltage, an alternating-current motor wound for a given voltage, a controller having an auto-transformer winding including a group of turns forming a first controller winding wound for said supply circuit voltage and including a group of turns forming a second controller winding wound for the voltage of said motor, and a third controller winding independent of the said two groups of turns wound for the voltage of said motor, an adjustable connection between intermediate points on the last two mentioned windings, said first controller winding being connected across said supply circuit, said motor having a main winding connected between one end of said second controller winding and the end of the third controller winding giving a voltage which will act to aid the voltage of the second controller winding in series therewith in the motor circuit, said third controller winding being so wound with respect to the second that the said series voltages increase or decrease as the adjustable connection is moved in one direction or the other, the motor having also an auxiliary winding and a condenser connected in series between the remaining ends of the second and third controller windings, whereby variation of the adjustable connection between the controller windings produces variations in the starting torque and speed of the motor.

CYRUS STONEHILL.